(12) United States Patent
Hsu et al.

(10) Patent No.: US 10,787,026 B2
(45) Date of Patent: Sep. 29, 2020

(54) INK-TYPE POINTER (71) Applicant: SHENZHEN PU YING INNOVATION TECHNOLOGY CORP., LTD., Shenzhen (CN)

(72) Inventors: Chung-Wen Hsu, Shenzhen (CN); Chung-Hsuan Li, Shenzhen (CN)

(73) Assignee: SHENZHEN PU YING INNOVATION TECHNOLOGY CORP., LTD., Shenzhen (CN)

( * ) Notice: Subject to any disclaimer, the term of this patent is extended or adjusted under 35 U.S.C. 154(b) by 30 days.

(21) Appl. No.: 16/373,012

(22) Filed: Apr. 2, 2019

(65) Prior Publication Data
US 2020/0047541 A1    Feb. 13, 2020

(30) Foreign Application Priority Data

Aug. 7, 2018   (CN) .......................... 2018 1 0890623

(51) Int. Cl.
*B43K 29/08* (2006.01)
*B43K 5/00* (2006.01)
*G06F 3/0354* (2013.01)

(52) U.S. Cl.
CPC .............. *B43K 29/08* (2013.01); *B43K 5/005* (2013.01); *G06F 3/03545* (2013.01)

(58) Field of Classification Search
CPC ........ B43K 29/00; B43K 29/08; B43K 29/18; B43K 5/005; G06F 3/03545; G06F 3/033; G06F 3/044; G06F 3/046
See application file for complete search history.

(56) References Cited

U.S. PATENT DOCUMENTS

| 4,573,819 A * | 3/1986 | Herrnring ................ B43K 5/00 401/151 |
| 10,427,449 B2 * | 10/2019 | Kaneda ................ B43K 27/006 |
| 10,459,539 B2 * | 10/2019 | Kamiyama ............. G06F 3/044 |
| 2017/0090605 A1 * | 3/2017 | Horie .................... G06F 3/0383 |

* cited by examiner

*Primary Examiner* — David J Walczak
(74) *Attorney, Agent, or Firm* — Rabin & Berdo, P.C.

(57) ABSTRACT

An ink-type pointer including a housing, a circuit unit, a pen and ink writing module, and an electromagnetic unit. The housing includes an end opening and an accommodation space. The end opening is in communication with the accommodation space. The circuit unit is disposed inside the accommodation space. The pen and ink writing module is disposed inside the accommodation space, and includes a cartridge, a nib, and liquid ink. The cartridge includes a chamber, the nib is connected to the cartridge and extends out of the end opening, and the liquid ink is accommodated in the cartridge and is output through the nib. The electromagnetic unit is disposed inside the accommodation space and includes a magnet and a coil. The magnet includes a through hole, the coil is wound round the magnet and is electrically connected to the circuit unit, and the cartridge passes through the through hole.

10 Claims, 7 Drawing Sheets

INK-TYPE POINTER

CROSS-REFERENCE TO RELATED APPLICATION

This non-provisional application claims priority under 35 U.S.C. § 119(a) to Patent Application No. 201810890623.9 filed in China, P.R.C. on Aug. 7, 2018, the entire contents of which are hereby incorporated by reference.

BACKGROUND

Technical Field

The present application relates to a pointer capable of generating digital handwriting, and particularly, to a pointer having an ink writing function.

Related Art

With popularization of digital products, types of touch-control electronic products become increasingly diversified, and an operation mode of forming digital handwriting by using a pointer is already well-known.

However, in some use statuses, some users are still accustomed to writing on paper by using a physical pen and physical ink. Based on this, the present inventor finds that this use mode would cause inconvenience in handwriting storage. In addition, the inconvenience in handwriting storage lies in that: when reservation of handwriting is wanted after a physical pen and physical ink are used to write on a paper, the handwriting can only be stored by using a scanner or by photographing images. That is, after writing by using a pen and ink, the handwriting can be reserved only by means of another procedure. When a paper with physical handwriting is lost carelessly, it is also difficult to recover the needed handwriting or record. Therefore, an improvement still needs to be made.

SUMMARY

The present application provides an ink-type pointer, including a housing, a circuit unit, a pen and ink writing module, and an electromagnetic unit, where the housing extends a length along an axial direction, and the housing includes an end opening and an accommodation space, where the end opening is in communication with the accommodation space. The circuit unit is disposed inside the accommodation space. The pen and ink writing module is disposed inside the accommodation space, and includes a cartridge, a nib, and liquid ink, where the cartridge extends a length along the axial direction and includes a chamber, the nib is connected to the cartridge and extends out of the end opening, and the liquid ink is accommodated in the cartridge and is output through the nib. The electromagnetic unit is disposed inside the accommodation space and includes a magnet and a coil, where the magnet includes a through hole, the through hole runs through two ends of the magnet in the axial direction, the coil is wound round the magnet and is electrically connected to the circuit unit, and the cartridge passes through the through hole.

DETAILED DESCRIPTION

Figure 1:
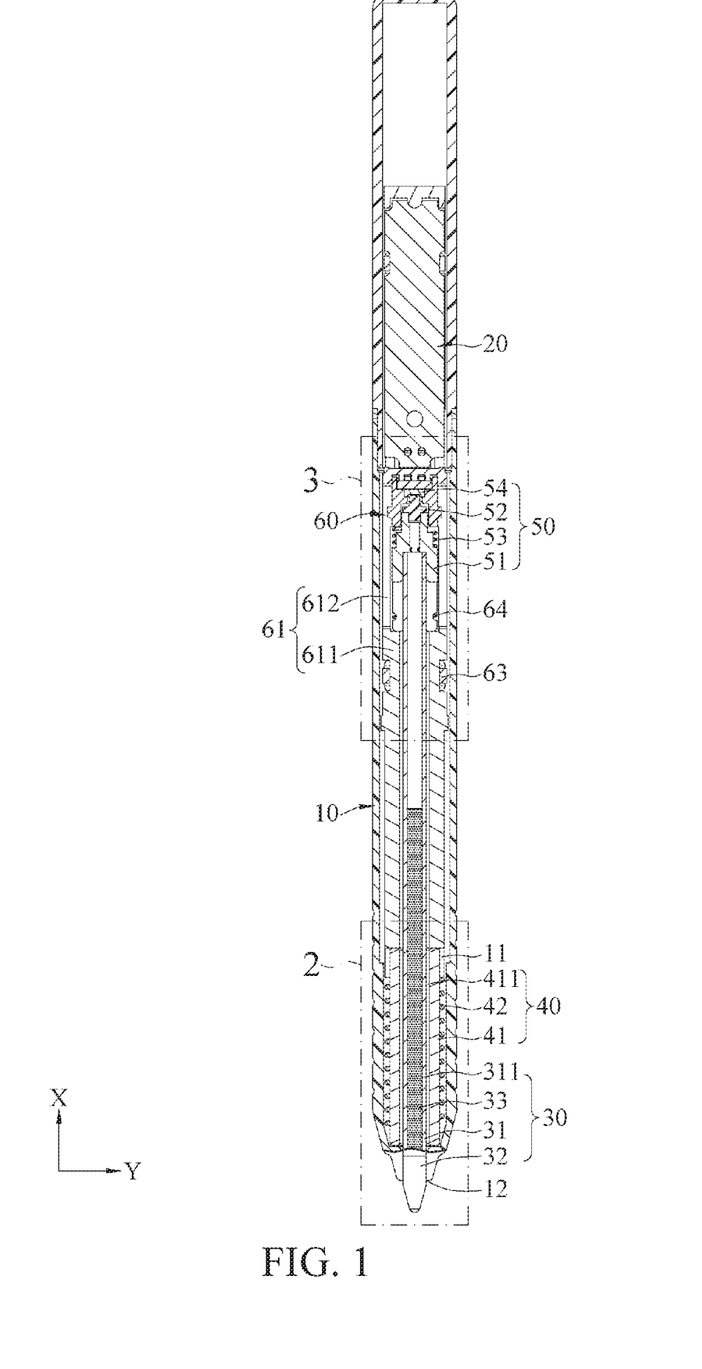
FIG. 1 is a schematic diagram of an embodiment of an ink-type pointer according to the present invention.

Referring to FIG. 1, FIG. 1 is a schematic diagram of an embodiment of an ink-type pointer according to the present invention. Herein, a pointer can perform electromagnetic induction while physically writing by using liquid ink to store digital handwriting.

The ink-type pointer shown in FIG. 1 includes a housing 10, a circuit unit 20, a pen and ink writing module 30, and an electromagnetic unit 40.

Figure 2:
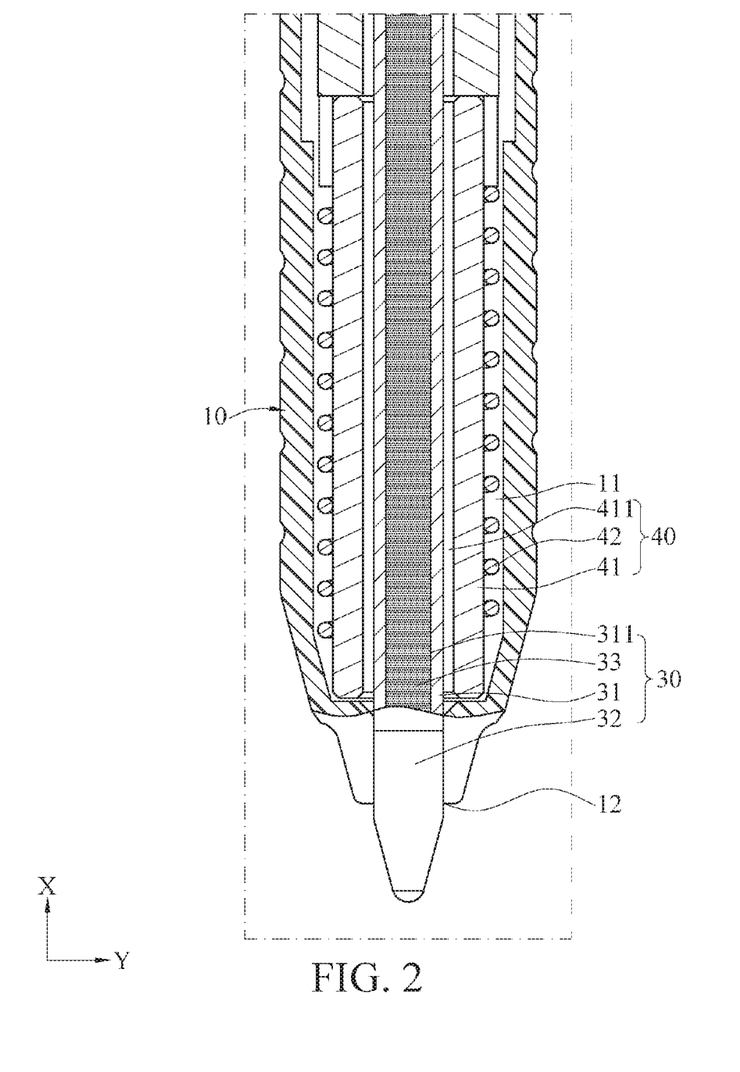
FIG. 2 is a locally enlarged diagram of a circled part 2 in FIG. 1.

Referring to FIG. 1 and FIG. 2, the housing 10 includes an accommodation space 11 and an end opening 12 in communication with the accommodation space 11. The circuit unit 20, the pen and ink writing module 30, and the electromagnetic unit 40 are separately disposed inside the accommodation space 11. The pen and ink writing module 30 includes a cartridge 31, a nib 32, and liquid ink 33. The cartridge 31 includes a chamber 311, the nib 32 is connected to the cartridge 31 and extends out of the end opening 12, and the liquid ink 33 is accommodated in the chamber 311 of the cartridge 31 and can be output through the nib 32 to draw real handwriting. The electromagnetic unit 40 includes a magnet 41 and a coil 42. The magnet 41 includes a through hole 411, the coil 42 is wound around the magnet 41 and is electrically connected to the circuit unit 20, and the cartridge 31 passes through the through hole 411.

Hence, during use, the pen and ink writing module 30 can be used alone to physically write by using a pen and ink or be used in cooperation with a digitizer tablet to record digital handwriting at the same time.

When the pointer is used in cooperation with a digitizer tablet capable of emitting electromagnetic energy, the circuit unit 20 enables the pointer to emit electromagnetic energy to the digitizer tablet, or to receive electromagnetic energy emitted by an antenna or an induction coil of the digitizer tablet. Herein, the digitizer tablet emits electromagnetic energy, the pointer receives the electromagnetic energy emitted by the digitizer tablet, and the coil 42 induces coupling electromagnetic energy. When the pointer performs writing work and changes a position relative to the digitizer tablet, a magnetic flux between the pointer and the digitizer tablet is changed. In this case, the circuit unit 20 can define a position point of the pointer by means of calculation according to a change of the magnetic flux. Therefore, the pointer can generate and record digital handwriting while physically writing.

In an embodiment, still referring to FIG. 1, the housing 10 is a hollow long-strip-shaped pen-type housing that extends a length along an axial direction X, but is not limited thereto. Herein, the housing 10 is in a detachable split-structured form to facilitate disassembling and replacing internal components, but is not limited thereto.

In an embodiment, referring to FIG. 1, the circuit unit 20 may be a printed circuit board. The circuit unit 20 includes an oscillation circuit and a control element, and is configured to calculate and define the position of the pointer.

In an embodiment, referring to FIG. 1 and FIG. 2, the cartridge 31 of the pen and ink writing module 30 is a hollow long rod that extends a length along the axial direction X, and the chamber 311 of the cartridge 31 runs through two ends of the cartridge 31 along the axial direction X.

Figure 3:
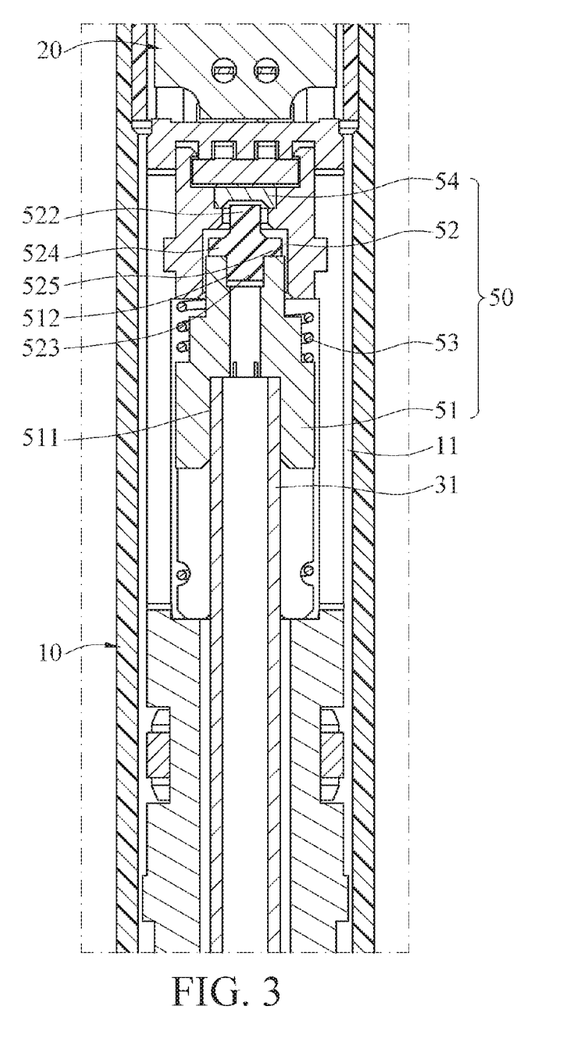
FIG. 3 is a locally enlarged diagram of a circled part 3 in FIG. 1.
Figure 4A:
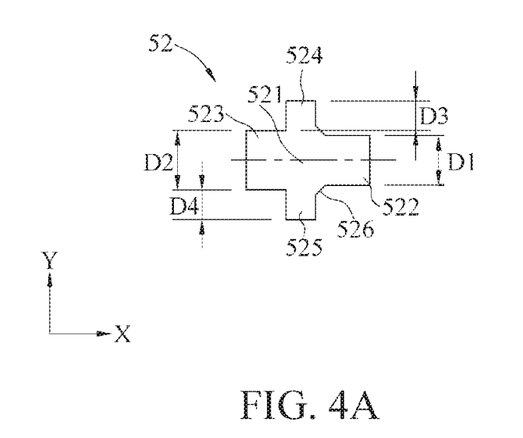
FIG. 4A is a schematic diagram of an embodiment of a first elastic member in an ink-type pointer according to the present invention.
Figure 4B:
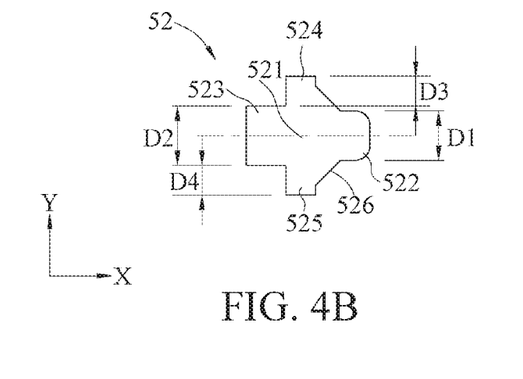
FIG. 4B is a schematic diagram of another embodiment of the first elastic member in the ink-type pointer according to the present invention.
Figure 4C:
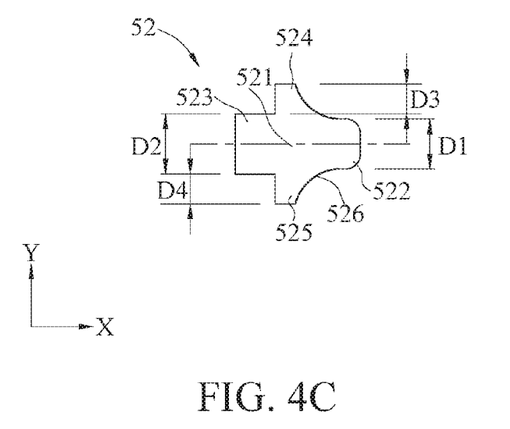
FIG. 4C is a schematic diagram of still another embodiment of the first elastic member in the ink-type pointer according to the present invention.
Figure 4D:
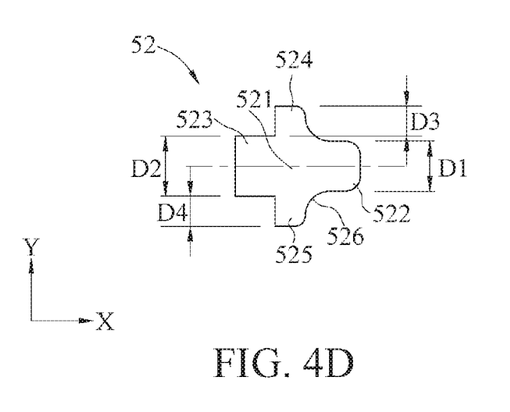
FIG. 4D is a schematic diagram of yet another embodiment of the first elastic member in the ink-type pointer according to the present invention.

In an embodiment, referring to FIG. 1 to FIG. 3, the nib 32 is disposed at one end of the cartridge 31 in the axial direction X. Herein, the nib 32 is adapted to output the liquid ink 33. Specifically, the nib 32 that is adapted to output the liquid ink 33 may be a nib 32 including a steel ball, a marker pen nib, a permanent pen nib, or a colored pen nib, and the foregoing forms of the nib 32 that is adapted to the liquid ink 33 are merely exemplary descriptions, and the present invention is not limited thereto. The nib 32 of this embodiment is a nib 32 including a steel ball. The liquid ink 33 can be output by means of continuous rolling of the steel ball of the nib 32 to perform writing by using a physical pen and physical ink.

Still referring to FIG. 1 and FIG. 2, the magnet 41 is a hollow column, but is not limited thereto. The magnet 41 includes a through hole 411, and the through hole 411 runs through two ends of the magnet 41 in the axial direction X. Therefore, the magnet 41 includes an outer surface and an inner surface that are opposite to each other, and the inner surface is a face that surrounds and defines the through hole 411. In addition, the magnet 41 of this embodiment is made of a magnetic material. Moreover, the coil 42 is wound around the outer surface of the magnet 41. Herein, two ends of the coil 42 may be connected to the circuit unit 20 through two conductive wires. Specifically, the magnet 41 is accommodated in the accommodation space 11 and is sleeved over the cartridge 31, to enable the cartridge 31 to pass through the through hole 411 of the magnet 41. In this embodiment, the cartridge 31 is located at a position of a medial axis of the magnet 41.

Further, referring to FIG. 1 and FIG. 3, to make the digital handwriting closer to real handwriting, a pressure sensing unit 50 is further included. The pressure sensing unit 50 includes a cartridge seat 51, a first elastic member 52, a second elastic member 53, and a pressure sensing element 54. The cartridge seat 51 may be movably disposed inside the accommodation space 11 along the axial direction X. Herein, the cartridge seat 51 includes a first jack 511 and a second jack 512, the first jack 511 and the second jack 512 are respectively located at two ends of the cartridge seat 51, and the first jack 511 is in communication with the second jack 512.

Still referring to FIG. 3, the other end of the cartridge 31 other than an end of the cartridge 31 connected to the nib 32 is combined with the first jack 511 of the cartridge seat 51, and the first elastic member 52 is combined with the second jack 512 of the cartridge seat 51. In this way, when a writing action is performed by using the nib 32 to apply a pressure to the nib 32, the nib 32 drives, by means of the cartridge seat 51, the first elastic member 52 to displace along the axial direction X.

Further referring to FIG. 3, the pressure sensing element 54 and the circuit unit 20 are electrically connected and are disposed on a displacement path of the first elastic member 52, and the pressure sensing element 54 faces toward the first elastic member 52 and can sense a pressure applied by the first elastic member 52 along the axial direction X. It should be noted that the applied pressure in the axial direction X that can be sensed by the pressure sensing element 54 includes a pressure of a force component in the axial direction X.

Hence, when physical writing is performed by using the pen and ink writing module 30, a pressure applied to the nib 32 during the writing process can be simultaneously sensed by the pressure sensing element 54, and a value of the pressure sensed by the pressure sensing element 54 can be simultaneously calculated and correspondingly displayed on digital handwriting, to enable the digital handwriting to also display a corresponding stroke pressure, so that the digital handwriting can be closer to real handwriting.

Herein, when a pressure is applied to the nib 32 of the pen and ink writing module 30, and a pressure is applied to the pressure sensing element 54, the nib 32 drives, by means of the cartridge seat 51, the first elastic member 52 to apply a pressure to the pressure sensing element 54. Therefore, while the first elastic member 52 applies a pressure to the pressure sensing element 54, the first elastic member 52 is also subject to a pressure to elastically deform and accumulate an elastic force. Accordingly, when the pressure applied to the nib 32 is released, the elastic force of the first elastic member 52 is released, so as to push the nib 32 back to an initial position. Hence, a restoration action of the nib 32 of the pen and ink writing module 30 is not limited to a position for placing the pointer, so as to ensure that the nib 32 can still be reliably restored to the initial position when the pointer is placed horizontally (a plane for placing is perpendicular to the axial direction X).

Further, referring to FIG. 3 and FIG. 4A to FIG. 4D together, in an embodiment, an entire cross-section of the first elastic member 52 is approximately in a cross shape. In addition, the first elastic member 52 includes a core portion 521 and a first section 522, a second section 523, a third section 524, and a fourth section 525 that extend toward different directions. The first section 522 and the second section 523 are opposite to each other and are respectively located at different positions in the axial direction X, and the third section 524 and the fourth section 525 are opposite to each other and are located at different positions in a radial direction Y. In addition, the third section 524 and the fourth section 525 are separately located between the first section 522 and the second section 523.

In addition, still referring to FIG. 4A to FIG. 4D, in the radial direction Y, the first section 522 has a first width D1, the second section 523 has a second width D2, the third section 524 has a third width D3, and the fourth section 525 has a fourth width D4. The first width D1 is less than the second width D2, the first width D1 is larger than the third width D3 and the fourth width D4, and the third width D3 is equal to the fourth width D4. The first section 522 is engaged with the third section 524 and the fourth section 525 separately through engagement portions 526. The engagement portion 526 is preferably an oblique angle or a circular arc. Implementations of the engagement portion 526 of the first elastic member 52 are shown in FIG. 4A to FIG. 4D. It should be noted that FIG. 4A to FIG. 4D are merely exemplary descriptions, and the present invention is not limited thereto.

Herein, referring to FIG. 3, the second jack 512 of the cartridge seat 51 is located at a central position of the cartridge seat 51 in the radial direction Y, the second section 523 of the first elastic member 52 is inserted into the second jack 512, the third section 524 and the fourth section 525 abut against a periphery of the second jack 512 of the cartridge seat 51, and the first section 522 extends toward the pressure sensing element 54.

Hence, when the nib 32 is subject to a pressure to drive the cartridge seat 51 by means of the cartridge 31, the cartridge seat 51 is combined with the second section 523 of the first elastic member 52 to stably drive the first elastic member 52. Moreover, the third section 524 and the fourth section 525 that abut against the cartridge seat 51 can stabilize the first elastic member 52, so that the first elastic member 52 does not easily deviate relative to the axial direction X, to ensure that the pressure that is applied to the first elastic member 52 can be reliably transferred to the pressure sensing element 54.

Referring to FIG. 3, the second section 523 of the first elastic member 52 is combined with the second jack 512 of the cartridge seat 51, and the third section 524 and the fourth section 525 abut against the cartridge seat 51. Therefore, the second section 523, the third section 524, and the fourth section 525 of the first elastic member 52 are abutted against by the rigid cartridge seat 51, and the first section 522 is a relatively free portion. When the first elastic member 52 is in contact with the pressure sensing element 54, the relatively free first section 522 of the first elastic member 52 is first in contact with the pressure sensing element 54. That is, a portion of the first elastic member 52 that is relatively easily deformable is first in contact with the pressure sensing element 54.

In this way, in an initial phase in which the first elastic member 52 is subject to a pressure, only the first section 522 rapidly feeds back a change of a pressure gradient, so that the pointer can reflect a stroke pressure in the digital handwriting under application of a slight pressure, and sensitivity of pressure feedback is improved.

Moreover, if the first elastic member 52 is continuously subject to a pressure, the first elastic member 52 changes from only the first section 522 being subject to the pressure to all the first section 522, the third section 524, and the fourth section 525 being subject to the pressure. If the third section 524 and the fourth section 525 of the first elastic member 52 also start to be subject to the pressure, rigidity of the first elastic member 52 is increased to reduce a change speed of the pressure gradient, and accordingly, an interval in which the first elastic member 52 reacts to a pressure change is extended.

Further, when the engagement portion 526 of the first elastic member 52 is an oblique angle or a circular arc, during a process in which the first elastic member 52 changes from only the first section 522 being subject to the pressure to both third section 524 and the fourth section 525 being subject to the pressure, the engagement portions 526 that engage the first section 522 with the third section 524 and the fourth section 525 are enabled to generate progressive pressure gradient changes, to prevent a pressure gradient from abruptly changing within a short time, thereby improving handfeel and comfort in use.

Still referring to FIG. 1 and FIG. 3, in an embodiment, the cartridge seat 51 further abuts against the second elastic member 53, and the second elastic member 53 can provide an elastic force in the axial direction X for the cartridge seat 51, so that a compression stroke of the second elastic member 53 is greater than a compression stroke of the first elastic member 52. In this way, when the nib 32 is subject to a pressure, to push, by means of the cartridge 31, the cartridge seat 51, the first elastic member 52 and the second elastic member 53 simultaneously accumulate elastic forces. When the pressure applied to the nib 32 is released, the elastic forces of the first elastic member 52 and the second elastic member 53 are simultaneously released to more reliably restore the nib 32 to an original status. More importantly, when the first elastic member 52 is likely to have elastic fatigue or deterioration, only the second elastic member 53 can still be used to elastically restore the cartridge 31, to ensure smoothness in use.

In an embodiment, the first elastic member 52 may be a block made of an elastic material, and the second elastic member 53 may be a spring, but the present invention is not limited thereto. Herein, the second elastic member 53 is a coil-shaped spring and can be sleeved over an outer periphery of the cartridge seat 51.

Figure 5:
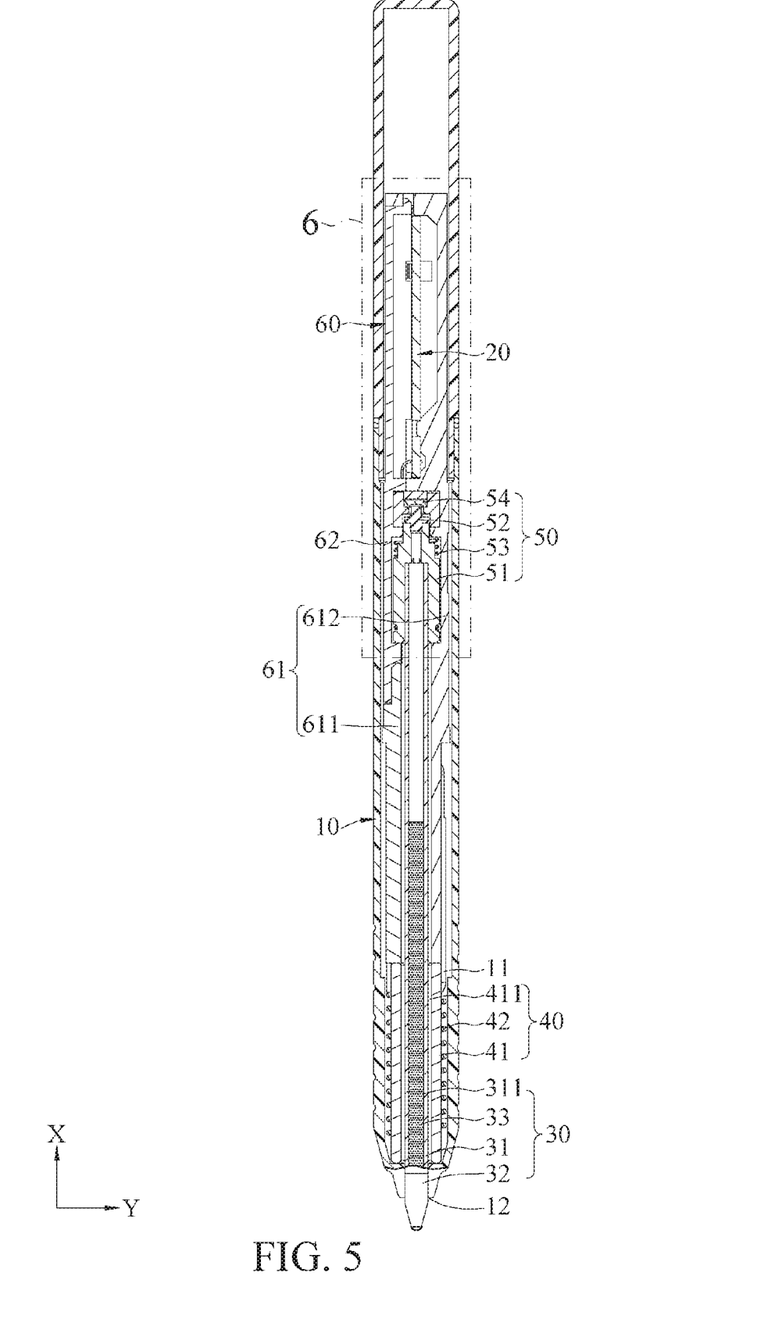
FIG. 5 is a cross-sectional view of an embodiment of an ink-type pointer from another perspective according to the present invention.
Figure 6:
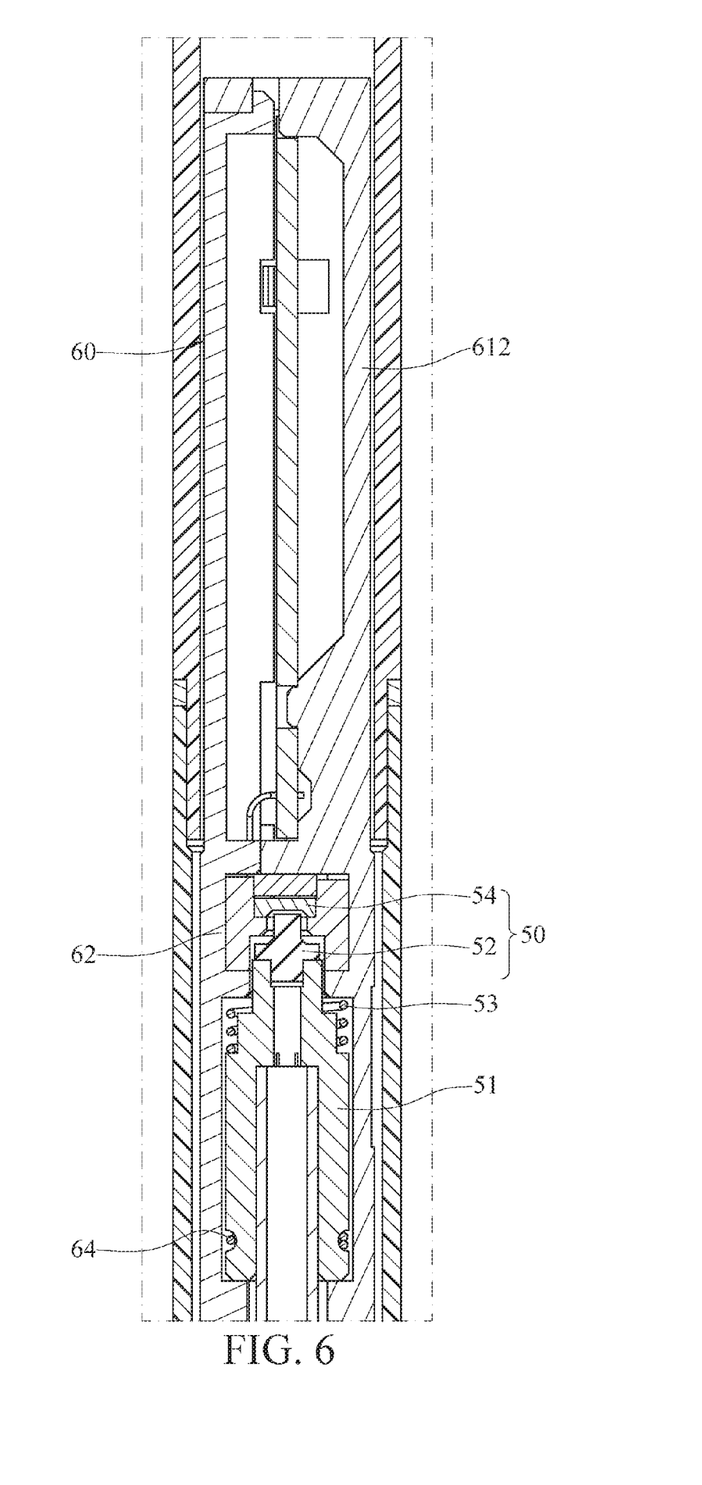
FIG. 6 is a locally enlarged diagram of a circled part 6 in FIG. 5.

In an embodiment, referring to FIG. 1, FIG. 5, and FIG. 6 together, an inner holder unit 60 is further included, and the inner holder unit 60 includes a first holder 61, a second holder 62, a snap 63, and a spring coil 64. The inner holder unit 60 is disposed inside the housing 10 to stabilize a position of the cartridge 31.

Herein, still referring to FIG. 1, FIG. 5, and FIG. 6, the first holder 61 includes a sleeve section 611 and a bearing section 612, the sleeve section 611 is in a hollow circular pipe form, the bearing section 612 is in a semi-circular thin-shell form, and the bearing section 612 is engaged with one end of the sleeve section 611. Herein, the sleeve section 611 of the first holder 61 is sleeved over the cartridge 31. Moreover, the pressure sensing unit 50 and the circuit unit 20 are located inside a range surrounded by the bearing section 612. Based on this, two ends of the sleeve section 611 of the first holder 61 respectively abut against the magnet 41 of the electromagnetic unit 40 and the cartridge seat 51, so that the electromagnetic unit 40 and the cartridge seat 51 are supported by a stable structure, to improve structural stability.

The second holder 62 is in a semi-circular thin-shell form, and the second holder 62 is detachably apposed to the bearing section 612 of the first holder 61. Herein, the second holder 62 and the bearing section 612 of the first holder 61 can be apposed to each other to form an outer contour the same as that of the sleeve section 611 of the first holder 61. Herein, because the second holder 62 is detachably apposed to the bearing section 612 of the first holder 61, the circuit unit 20 and the pressure sensing unit 50 can be assembled when the second holder 62 is detached, and after the assembly, the second holder 62 is further combined with the bearing section 612, thereby improving convenience in assembly.

Further, the snap 63 is sleeved over the sleeve section 611 of the first holder 61 in a bundling manner, so that moving positions of the cartridge 31 and the cartridge seat 51 inside the sleeve section 611 are limited, thereby improving stability of the cartridge 31 during use. In addition, the spring coil 64 is sleeved over the cartridge seat 51 in a bundling manner, so that the cartridge 31 inside the cartridge seat 51 is stably tightly bundled, thereby also ensuring stability of the cartridge 31 in use.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An ink-type pointer, comprising:
a housing, extending a length along an axial direction, and comprising an end opening and an accommodation space, wherein the end opening is in communication with the accommodation space;
a circuit unit, disposed inside the accommodation space;
a pen and ink writing module, disposed inside the accommodation space, and comprising a cartridge, a nib, and liquid ink, wherein the cartridge extends a length along the axial direction and comprises a chamber, the nib is connected to the cartridge and extends out of the end opening, and the liquid ink is accommodated in the chamber and is output through the nib; and
an electromagnetic unit, disposed inside the accommodation space and comprising a magnet and a coil, wherein the magnet comprises a through hole, the through hole runs through two ends of the magnet in the axial direction, the coil is wound round the magnet and is electrically connected to the circuit unit, and the cartridge passes through the through hole.

2. The ink-type pointer according to claim 1, further comprising a pressure sensing element, wherein the pressure sensing element is disposed inside the accommodation space, and faces toward an other end of the cartridge other than an end of the cartridge connected to the nib, the pressure sensing element is electrically connected to the circuit unit, and the cartridge can displace along the axial direction and apply a pressure to the pressure sensing element.

3. The ink-type pointer according to claim 2, further comprising a first elastic member, located between the pressure sensing element and the cartridge.

4. The ink-type pointer according to claim 3, further comprising a cartridge seat, wherein the first elastic member is inserted into one end of the cartridge seat, and the cartridge is inserted into the other end of the cartridge seat.

5. The ink-type pointer according to claim 4, wherein the first elastic member comprises a first section and a second section, a width of the first section in a radial direction perpendicular to the axial direction is less than a width of the second section in the radial direction, the first section faces toward the pressure sensing element, and the second section is disposed in the cartridge seat.

6. The ink-type pointer according to claim 4, further comprising a second elastic member, wherein the cartridge seat is sheathed with and abuts against the second elastic member, and the second elastic member provides an elastic force in the axial direction for the cartridge seat.

7. The ink-type pointer according to claim 4, further comprising an inner holder unit, wherein the inner holder unit comprises a first holder and a second holder, the first holder is sleeved over the cartridge and abuts against the magnet and the cartridge seat, and the second holder is combined with the first holder and wraps the cartridge seat.

8. The ink-type pointer according to claim 7, wherein the first holder comprises a sleeve section and a bearing section, the sleeve section is in a hollow circular pipe form, and the bearing section is a semi-circular thin-shell form, the bearing section is engaged with one end of the sleeve section, the second holder is apposed to the bearing section, and the cartridge seat is located between the second holder and the bearing section.

9. The ink-type pointer according to claim 8, wherein the inner holder unit further comprises a snap, and the snap is fixed outside the first holder.

10. The ink-type pointer according to claim 8, wherein the inner holder unit further comprises a spring coil, and the spring coil is sleeved over the cartridge seat in a bundling manner.

* * * * *